US005925224A

United States Patent [19]

Kobayashi et al.

[11] Patent Number: 5,925,224

[45] Date of Patent: Jul. 20, 1999

[54] METHOD OF AND APPARATUS FOR PURIFYING A SOLVENT

[75] Inventors: Kazuki Kobayashi, Osaka; Kouji Matsuoka, Nara; Kensuke Yano; Norio Adachi, both of Hyogo; Tatsuo Takami, Kobe; Hiroshi Morikawa, Nara, all of Japan

[73] Assignee: Sharp Kabushiki Kaisha, Osaka, Japan

[21] Appl. No.: 08/620,237

[22] Filed: Mar. 22, 1996

[30] Foreign Application Priority Data

Aug. 4, 1995 [JP] Japan .................................... 7-219748

[51] Int. Cl.[6] ................................ B01D 3/14; B01D 5/00

[52] U.S. Cl. ................................ 203/47; 203/40; 203/44

[58] Field of Search ................................ 203/40, 44, 47, 203/12

[56] References Cited

U.S. PATENT DOCUMENTS 3,073,755 1/1963 Banfield et al. ............................ 203/7
5,348,588 9/1994 Winston .................................... 203/47
5,456,898 10/1995 Shimokawa et al. ..................... 203/40

*Primary Examiner*—Tae Yoon
*Attorney, Agent, or Firm*—Edwin E. Greigg; Ronald E. Greigg

[57] ABSTRACT

A solvent containing low-boiling and high-boiling impurities in an evaporating section, so that the high-boiling impurities is left as a tank bottom waste, and a solvent vapor from the section is guide through a mist separator into a condenser. A condensate produced in the condenser is returned to the mist separator so as to serve as a mist catching liquid. A fraction not having condensed in the condenser is fed to a rectifying section where fractional condensation is performed so that the low-boiling impurities are condensed to be removed. A remainder of the solvent vapor from which the impurities have been removed is also condensed and recovered for reuse in the resist washing/exfoliating step during manufacture of liquid crystal devices or IC, so that the soiled solvent need not be discarded or treated in a remote cite, thereby facilitating the process or the step using the solvent.

4 Claims, 3 Drawing Sheets

METHOD OF AND APPARATUS FOR PURIFYING A SOLVENT

BACKGROUND OF THE INVENTION

1. Field of the Invention

The present invention relates to the repurification and recovery of a solvent, and more particularly relates to a method of and an apparatus for purifying a solvent that has been used in the plants manufacturing certain liquid crystal devices or certain integrated circuit chips or the like and contains considerable amounts of low boiling fractions and high boiling fractions.

2. Prior Art

Various resists are used to manufacture the liquid crystal devices or integrated circuits (IC), and the latter are washed with a solvent so as to remove those resists. The solvent may be a water insoluble one or a water soluble one. The water soluble solvent is convenient to wash those devices or circuits, subsequent to removal thereof.

Those solvents gradually lose their washing efficiency or power when used repeatedly to wash the liquid crystal or the like electronic devices. This is because the low boiling fractions such as water as well as the high boiling ones such as the resist components are accumulated in the solvent.

Therefore, it has been a common practice either to replace at once the dirty or impure solvent with a fresh one, or to add the latter at a constant rate.

Thus, the dirty solvent has been discarded from the abovementioned plants either intermittently or continuously, resulting in an environmental pollution and/or an economical loss. Even if the impure solvent is refreshed at a recovery plant located remote from the said manufacture plant, an undesirably high transportation cost will be incurred.

SUMMARY OF THE INVENTION

An object of the present invention made in view of those drawbacks is to provide an advanced method of and an improved apparatus for refreshing and recovering a solvent that has been used to wash and/or remove the resist in the plants for manufacturing the liquid crystal devices or ICs. Another object is to render it no longer necessary for those manufacture plants to discard batch-wise or at a constant rate or to transport the soiled solvent to a remote recovery plant, such that the processes using the solvent in said manufacture plants can operate continuously and more efficiently.

The method proposed herein to achieve the objects comprises the steps of: evaporating within an evaporator a used solvent contaminated with low-boiling and high-boiling impurities due to treatment of electronics devices in manufacture processes using the solvent, wherein the high-boiling impurities is left in the evaporator so as to be removed therefrom as a tank bottom waste, with a solvent vapor generated in the evaporator and containing the low-boiling impurities thereby being taken out of the evaporator; then guiding the solvent vapor through a mist separator into a condenser, so that mist particles entrained in the vapor are caught by the separator and said vapor partially condenses in the condenser to return to said separator and serve therein as a mist catching liquid, with an uncondensed remainder of the solvent vapor still containing the low-boiling impurities; and finally carrying out fractional condensation of the uncondensed solvent vapor within a rectification column such that a fraction of said vapor condenses as a liquid waste rich in the low-boiling impurities and is removed from the column, with a remainder of said solvent vapor also being condensed but recovered for reuse in the manufacture processes for the electronics devices, whereby an overall purity of the solvent operating in said processes can be controlled to fall within a prescribed range.

In a typical embodiment of the method summarized above, one of the processes using the solvent is the step of washing and exfoliating resists from liquid crystal devices that are being manufactured. In this case, a main ingredient of the low-boiling impurities is water, with the high-boiling impurities essentially consisting of resist components.

The apparatus which the present invention provides for achieving the objects and for performing the method summarized above does comprise (a) an evaporating section and (b) a rectifying section operatively connected thereto, wherein the evaporating section comprises an evaporator for boiling a used solvent contaminated with low-boiling impurities and high-boiling impurities due to treatment of electronics devices, the treatment being carried out during processes using the solvent to manufacture the electronics devices, with the high-boiling impurities being left in the evaporator so as to be removed therefrom as a tank bottom waste, so that a mixed vapor of the solvent containing the low-boiling impurities being taken out of the evaporator. The evaporating section further comprises: a mist separator connected to and downstreamly of the evaporator so as to catch mist particles entrained in the mixed vapor flowing from the evaporator and containing the low-boiling impurities; and a condenser connected to and also downstreamly of the mist separator for partially condensing the mixed vapor flowing from the mist separator to form a condensate returned thereto as a mist catching liquid, with an uncondensed remainder of the solvent vapor still containing the low-boiling impurities, wherein the rectifying section comprises a rectification column for fractionally condensing the uncondensed solvent vapor such that the low-boiling impurities thereof completely condense to be removed from the column, with a remainder of the solvent vapor being also condensed and recovered as a refreshed solvent.

Preferably, the evaporator may be of the 'thin film-descending type', and the mist separator may be a packed tower operating with a mist catching liquid that is a condensate produced in the condenser.

The rectification column employed herein characteristically receives, directly in the 'vapor-feed' manner, from the condenser the vapor mixture having not condensed therein.

In the method proposed herein, the solvent soiled with the low-boiling impurities and high-boiling impurities is boiled to leave a fraction of the former impurities as the tank bottom to be removed from the evaporator. The mist entrained by the mixed vapor and carrying another fraction of said high-boiling impurities is washed with and caught by a condensate that is fed to the mist separator from the downstream condenser. Due to these two separating functions, those fractions of high-boiling impurities will be eliminated almost completely and surely from this system. Due to the fractional condensation carried out in the rectification column, a condensate of the low-boiling impurities will effectively be removed from the remainder of solvent. The refreshed solvent thus having both the low-boiling and high-boiling impurities almost entirely removed will be reused in the processes such as that for washing and/or exfoliating the resist from the liquid crystal devices, the integrated circuit boards (IC) or the like electronics parts. Thus, an overall purity of the solvent operating in those processes can be controlled to fall within a prescribed range, thereby improving the efficiency of said processes. Any soiled portion of the running solvent need no longer be discarded out of the system or treated at a remote recovery plant.

The apparatus provided herein comprises, as summarized above, the evaporating section and the rectifying section combined with each other such that the high-boiling impurities are almost completely removed from the solvent by the functions of the evaporator and the mist separator, before the low-boiling impurities are eliminated by the rectification column to refresh the solvent for reuse. Therefore, the method of the present invention can be conveniently performed using such an apparatus.

The 'thin film-descending type' of the evaporator is advantageous in that the solvent need be heated for a shorter period of time, thus protecting the solvent from thermal decomposition. The packed tower employed as the mist separator is advantageous in that the mist catching liquid need not be supplied from any foreign source at a controlled rate, but the condensate produced in the downstream condenser may be utilized easily and without necessitating any difficult control.

The 'vapor feed' manner of feeding the uncondensed solvent to the rectifying section improves the efficiency of the overall process.

Both the method and the apparatus, which the present invention provides to refresh and recover the solvent, are useful particularly in the case wherein a major ingredient of the low-boiling impurities boiling at lower temperatures is water, with a major component of the high-boiling impurities boiling at higher temperatures being the resist compounds, and the solvent is used to wash and/or exfoliate the resist coatings of liquid crystal devices. The recycling of the refreshed solvent from which those impurities have preliminarily been removed is effective to keep constant the washing capacity of the solvent system. Thus, the present invention diminishes the problem which has resulted from a noticeable difference observed in the washing capacity between the renewed and unrenewed solvent systems. It is noted here that the time- and labor-consuming works for carrying solvent lots in and out of the plant and for treating them to refresh have been one of bottlenecks to raise the production efficiency in manufacture of the liquid crystal devices. The washing/exfoliating step will now be facilitated by the present invention not to impair any longer the overall efficiency. The stabilized washing capacity prolongs the time intervals at which the solvent system must be replaced wholly with a new one, thereby reducing material and operation cost for maintenance of the solvent system, and decreasing the amount of liquid waste hazardous to environment.

DETAILED DESCRIPTION OF THE PREFERRED EMBODIMENTS

Figure 1:
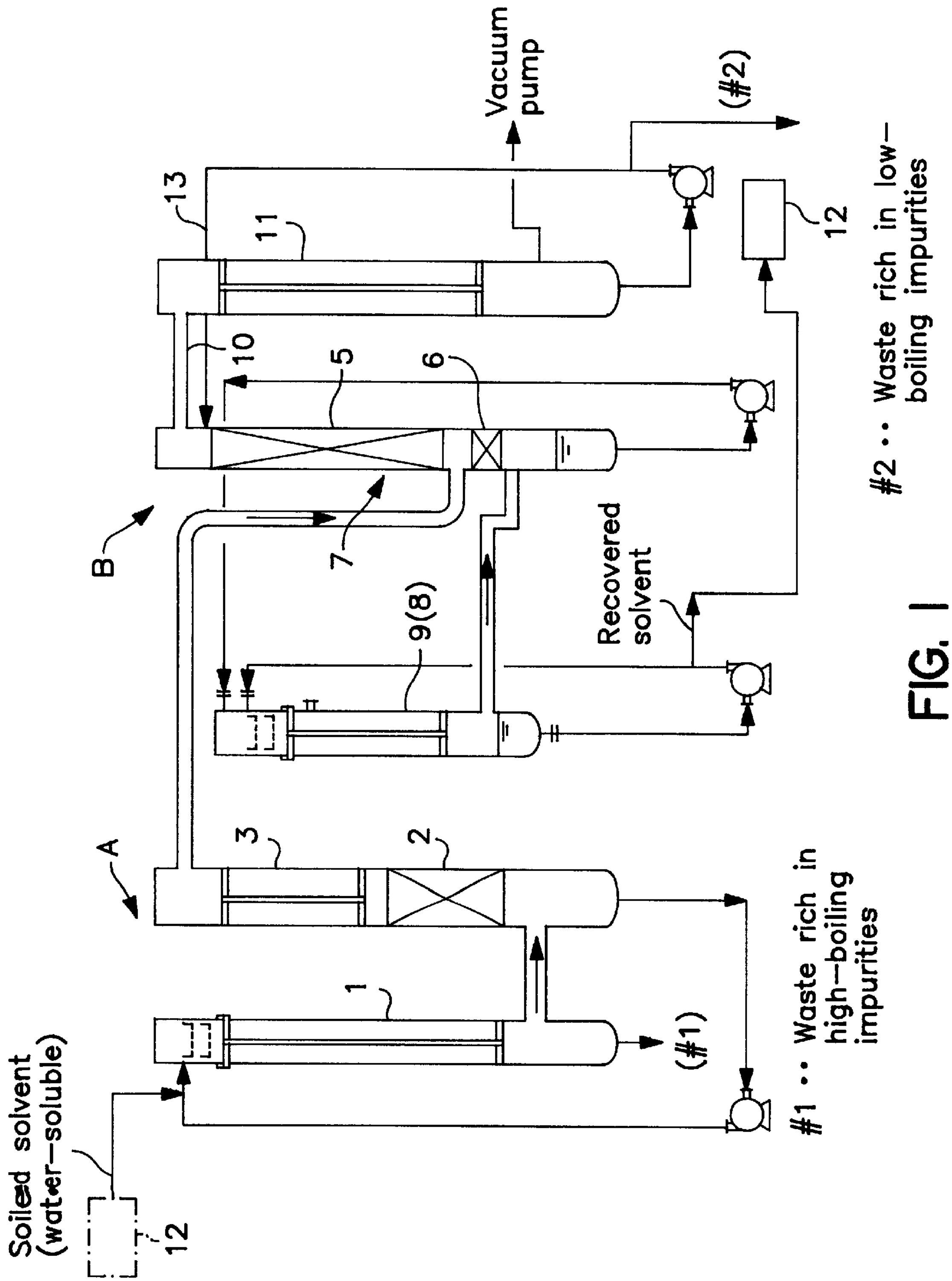
FIG. 1 schematically shows an apparatus for purifying a solvent, with the apparatus being provided in an embodiment of the present invention.

Now, the present invention will be described in more detail referring to an embodiment shown in the drawings.

An apparatus provided in the embodiment illustrated in FIG. 1 is designed to purify a water-soluble mixed solvent comprising DMSO (dimethyl sulfoxide) and NMP (N-methyl-2-pyrrolidone). In general, this solvent once used in the step of washing/exfoliating resist layers in manufacture of liquid crystal devices will be inevitably contaminated with and contain noticeable amounts of water (as the low-boiling impurities) and resist components (as the high-boiling impurities).

The apparatus provided in the embodiment comprises an evaporating section 'A' and a rectifying section 'B' operatively connected thereto. The evaporating section 'A' comprises an evaporator 1 for boiling the used solvent containing the low-boiling impurities and the high-boiling impurities, thereby generating a solvent vapor. A tank bottom waste accumulated in the evaporator 1 is rich in the high-boiling impurities and therefore is to be exhausted periodically. A mist separator 2 of the wet type also constitute the evaporating section 'A' so as to catch and separate mist particles from the solvent vapor. The section 'A' further comprises a condenser 3 that condenses a portion of the solvent vapor having passed through the mist separator 2, with an uncondensed remainder of said vapor being transferred to the rectifying section 'B'. A condensate produced in the condenser 3 will be returned to the mist separator, and used therein as a mist catching or washing liquid. A minor portion of the uncondensed vapor continuously flowing into the rectifying section 'B' will be condensed therein to become rich in the low-boiling impurities, and has therefore to be discarded or otherwise treated with. A major of said uncondensed vapor flowing into this section 'B' will also be condensed therein to become a refreshed solvent free of the impurities.

In this embodiment, the evaporator 1 in the evaporating section 'A' is of the thin film-descending type such that the solvent is heated rapidly in short time and protected from thermal decomposition.

The mist separator 2 in this embodiment is a packed tower (called 'wet-type demister') filled with packings in a controlled manner. The condenser 3 is of the multi-tube type, and a condensed amount of the vapor is allowed to return to the mist separator so as to serve therein as a mist washing/catching liquid.

The rectifying section 'B' for fractional condensation essentially consists of a rectification column 7 and a reboiler 9. The column 7 comprises a condensation zone 5 and recovery zone 6, with the reboiler 9 being formed as a heating vessel of the thin film-descending type. The recovery zone 6 may be dispensed with, if it is not difficult for the content of the low-boiling impurities to be suppressed below a desirable level, as is usual in the ordinary apparatuses for solvent recovery.

The solvent vapor will be subjected to the fractional condensation in the rectification column 7. In detail, a major or substantial fraction of said vapor will be condensed in said column and extracted from the bottom of reboiler 9 so as to provide a refreshed solvent, after separated from the low-boiling impurities. The solvent thus recovered will be fed to a station 12 and reused there to wash (exfoliate) the resist.

A pipe 10 connected to a top of the rectification column 7 operates to extract therefrom a vapor of the low-boiling impurities whose main component is water vapor. A condenser 11 communicating with the pipe 10 will condense the water vapor.

In operation of the apparatus described above, a solvent vapor will be fed continuously to the evaporator 1 in the evaporating section 'A', where the high-boiling impurities are left not evaporated and to be removed as the tank bottom waste, with the other fractions being evaporated for the subsequent processing.

In the mist separator 2 receiving the solvent vapor from the evaporating section 'A', mist particles of high-boiling impurities are separated from the solvent vapor. This vapor flowing out of the separator 2 is free of said impurities, when entering the condenser 3 to be partially condensed therein. A condensate generated in said condenser will return to the separator to serve as the mist catching liquid.

The solvent vapor that has not condensed in the condenser 3 will be 'vapor fed' to the rectifying section 'B' and undergo the fractional condensation in the rectification column 7. The low-boiling impurities will be condensed in the condenser 11 and extracted from the major vapor fraction, which will also condense to be extracted from the bottom of the reboiler 9. A portion of condensate effluent from the condenser 11 is returned through a pipe 13 to the top of the column 7, with a reminder being discharged from this system.

Figure 2:
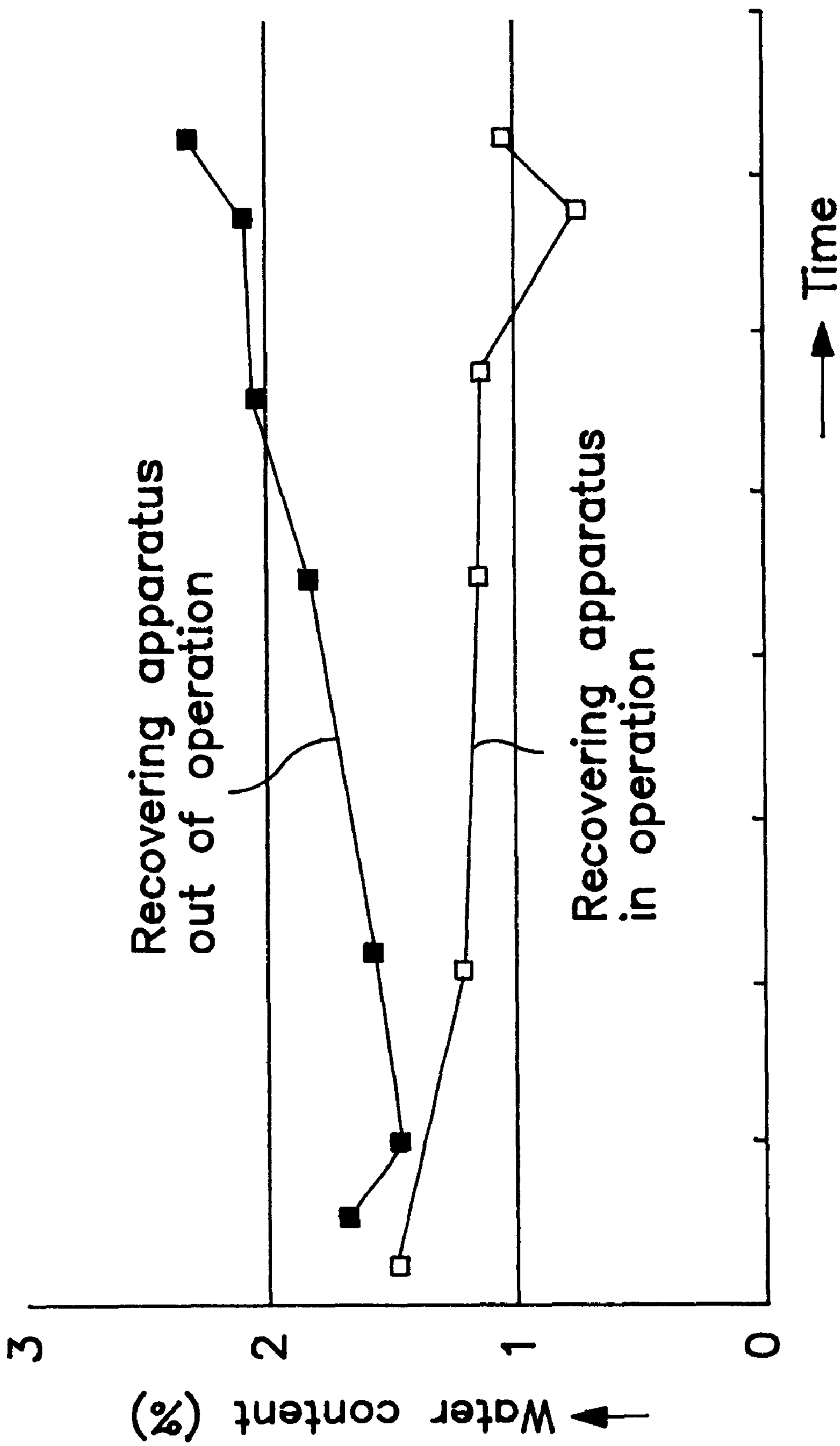
FIG. 2 is a graph showing the change observed in the course of time in concentration of water contained in a solvent, with and without the apparatus of FIG. 1 being operated.
Figure 3:
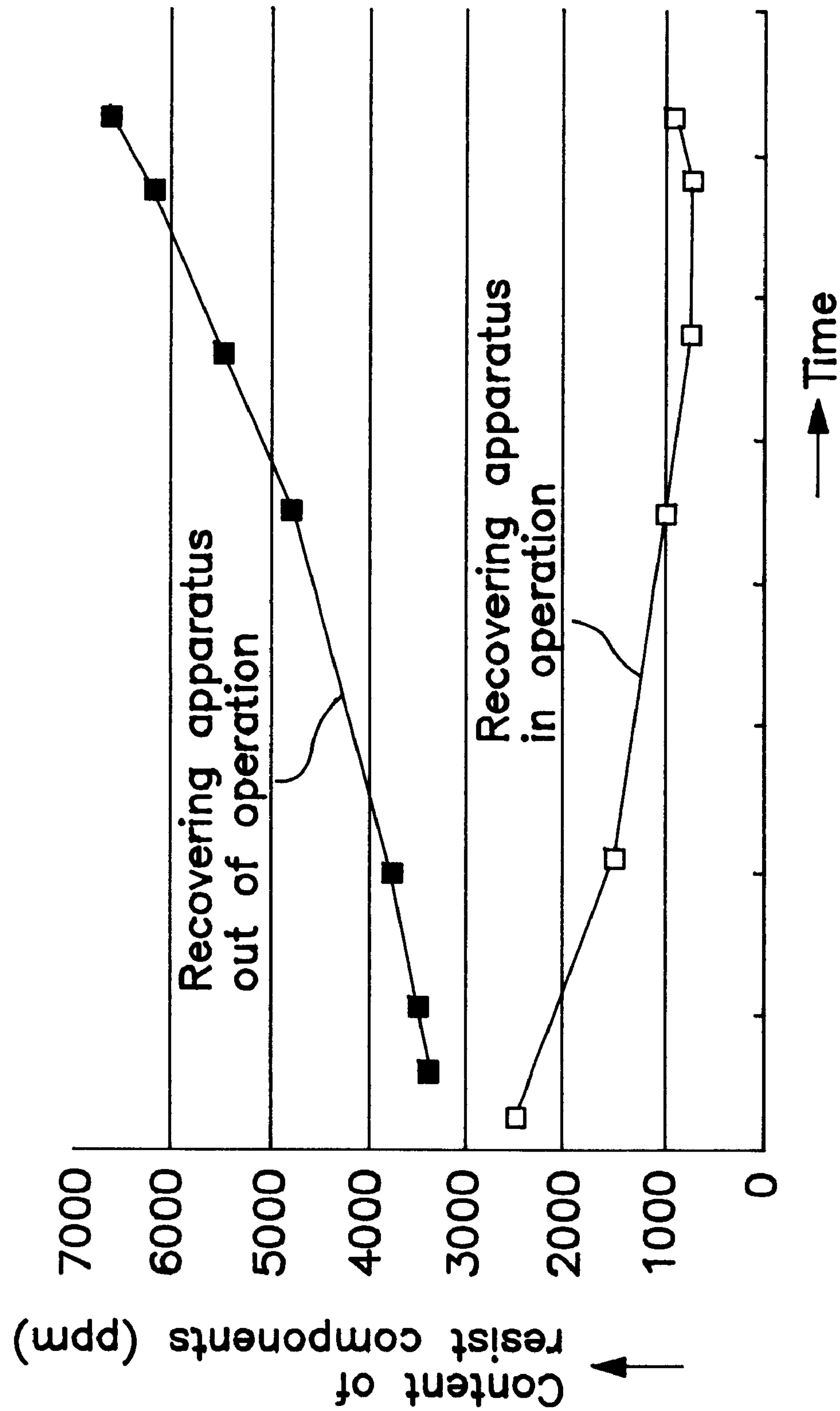
FIG. 3 is similarly a graph showing the change also observed in the course of time in concentration of resist compounds contained in the solvent, with and without the apparatus being operated.

The solvent thus refreshed and recovered will be recycled continuously to the resist washing (exfoliating) process 12. It is no longer necessary to take any soiled fraction of the solvent out of system, either for discarding or refreshing same, and it is now possible to maintain the solvent purity high enough to efficiently operate the resist washing (exfoliating) process. FIG. 2 shows the change in the course of time in the concentration of water contained in the solvent, with the apparatus for purifying same being operated in one case and standing inoperative in the other case. Similarly, FIG. 3 shows the change in concentration of the resist components in the solvent, in the two cases.

For an easier and better understanding of the invention, the solvent exemplified in the embodiment is water soluble wherein the low-boiling and high-boiling impurities are water and resist components. However, the solvent may instead be water insoluble and the present invention may apply also thereto.

Therefore, impurities and other details are not restricted to the exemplified ones. The structure of the evaporating section, the type of evaporator included therein, the type of wet mist-separator (including the type of packings and the manner of loading same), the type and structure of the condenser in said section, and the structure and number of stages in the rectifying section, are all modifiable within the scope of the present invention. The recovery zone in the latter section may be dispensed with, if not desirable or not necessary.

In summary, by the method proposed herein, the solvent soiled with the low-boiling impurities and high-boiling impurities is boiled to leave a fraction of the former impurities as the tank bottom to be removed from the evaporator. The mist entrained by the solvent vapor and carrying another fraction of said high-boiling impurities is washed with and caught by a condensate that is fed to the mist separator from the downstream condenser. Due to these two separating functions, those fractions of high-boiling impurities will be eliminated almost completely and surely from this system. Due to the fractional condensation carried out in the rectification column, a condensate of the low-boiling impurities will effectively be removed from the remainder of solvent. The refreshed solvent thus having both the low-boiling and high-boiling impurities almost entirely removed will be reused in the processes such as that for washing and/or exfoliating the resist. Thus, an overall purity of the solvent operating in those processes can be controlled to fall within a prescribed range.

Consequently, the efficiency of said processes of washing/exfoliating the resist from the liquid crystal devices, ICs or the like during manufacture thereof. Any soiled portion of the running solvent need no longer be discarded out of the system or treated at a remote recovery plant, thereby improving production efficiency.

The apparatus provided herein comprises, as summarized above, the evaporating section and the rectifying section combined with each other such that the high-boiling impurities are almost completely removed from the solvent by the functions of the evaporator and the mist separator, before the low-boiling impurities are eliminated by the rectification column to refresh the solvent for reuse. Therefore, the method of the present invention can be conveniently performed using such an apparatus.

The 'thin film-descending type' of the evaporator is advantageous in that the solvent need be heated for a shorter period of time, thus protecting the solvent from thermal decomposition. The packed tower employed as the mist separator is advantageous in that the mist catching liquid need not be supplied from any foreign source at a controlled rate, but the condensate produced in the downstream condenser may be utilized easily and without necessitating any difficult control.

The 'vapor feed' manner of feeding the uncondensed solvent to the rectifying section improves the efficiency of the overall process.

Both the method and the apparatus, which the present invention provides to refresh and recover the solvent, are useful particularly in the case wherein a major ingredient of the low-boiling impurities boiling at lower temperatures is water, with a major component of the high-boiling impurities boiling at higher temperatures being the resist compounds, and the solvent is used to wash and/or exfoliate the resist coatings of liquid crystal devices. The recycling of the refreshed solvent from which those impurities have preliminarily been removed is effective to keep constant the washing capacity of the solvent system. Thus, the present invention diminishes the problem which has resulted from a noticeable difference observed in the washing capacity between the renewed and unrenewed solvent systems. It is noted here that the time- and labor-consuming works for carrying solvent lots in and out of the plant and for treating them to refresh have been one of bottlenecks to raise the production efficiency in manufacture of the liquid crystal devices. The washing/exfoliating step will now be facilitated by the present invention not to impair any longer the overall efficiency. The stabilized washing capacity prolongs the time intervals at which the solvent system must be replaced wholly with a new one, thereby reducing material and operation cost for maintenance of the solvent system, and decreasing the amount of liquid waste hazardous to environment.

The foregoing relates to preferred exemplary embodiments of the invention, it being understood that other variants and embodiments thereof are possible within the spirit and scope of the invention, the latter being defined by the appended claims.

What is claimed is:

1. A method of purifying a solvent, the method comprising the steps of:

evaporating within an evaporator a used solvent contaminated with low-boiling and high-boiling impurities due to treatment of electronics devices in a manufacture process using the solvent, leaving any high-boiling impurities in the evaporator so as to be removed therefrom as a tank bottom waste, removing from the evaporator a solvent vapor generated in the evaporator and containing the low-boiling impurities;

then guiding the solvent vapor through a mist separator into a condenser, so that mist particles entrained in the vapor are caught by the separator and said vapor partially condenses in the condenser to return to said separator and serve therein as a mist catching liquid, with an uncondensed remainder of the solvent vapor still containing the low-boiling impurities;

finally carrying out fractional condensation of the uncondensed solvent vapor within a rectification column such that a fraction of said vapor condenses as a liquid waste rich in the low-boiling impurities and is removed from the column, with a remainder of said solvent vapor also being condensed but recovered for reuse in the manufacture processes for the electronics devices, whereby an overall purity of the solvent operating in said processes can be controlled to fall within a prescribed range, and wherein the used solvent is a mixture of dimethyl sulfoxide and N-methyl-2-pyrrolidone.

2. The method as defined in claim 1, wherein the process using the solvent is the step of washing and exfoliating resists from liquid crystal devices that are being manufactured, and wherein a main ingredient of the low-boiling impurities is water, with the high-boiling impurities essentially consisting of resist components.

3. The method as defined in claim 1, wherein the mist separator and the condenser form a tower downstreamly and, independently of the evaporator so as to conduct therein, evaporation of the used solvent.

4. The method as defined in claim 1, wherein the rectification column is accompanied by a reboiler so that all the amount of raw condensate from the rectification column is fed to the reboiler, before returning to the rectification column, whereby separation of the low-boiling impurities is completed in the reboiler.

* * * * *

UNITED STATES PATENT AND TRADEMARK OFFICE
CERTIFICATE OF CORRECTION

PATENT NO. : 5,925,224

DATED : July 20, 1999

INVENTOR(S) : Kazuki Kobayashi et al

It is certified that error appears in the above-identified patent and that said Letters Patent is hereby corrected as shown below:

On the Title page, correct the assignee to read:

[73] Sharp Kabushiki Kaisha, Osaka, Japan
and Kimura Chemical Plants Co., Ltd.,
Hyogo, Japan Signed and Sealed this Twentieth Day of March, 2001

Attest:

Nicholas P. Godici

NICHOLAS P. GODICI

*Attesting Officer* *Acting Director of the United States Patent and Trademark Office*